Feb. 16, 1932.  F. B. THOMSON  1,845,365
CONDUIT AND PIPE CLAMP
Filed Dec. 10, 1929  2 Sheets-Sheet 1
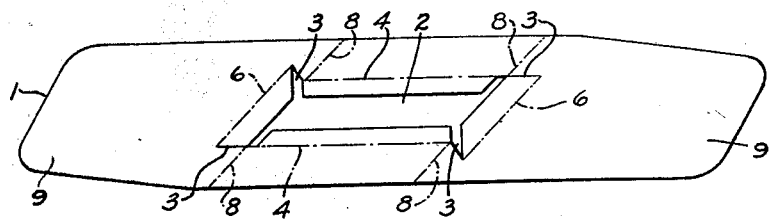
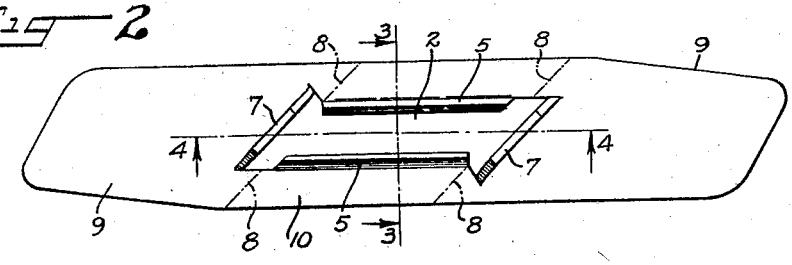
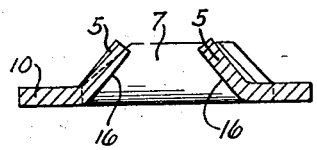
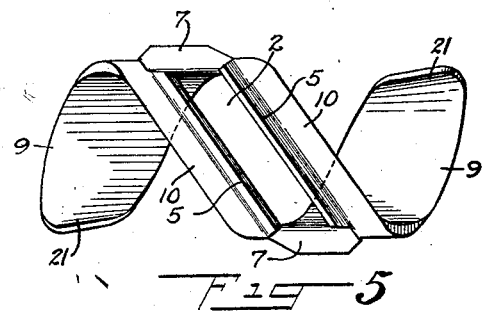
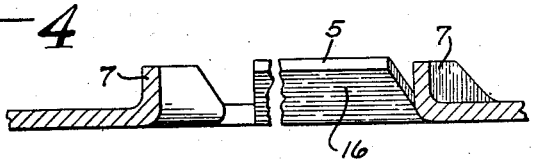
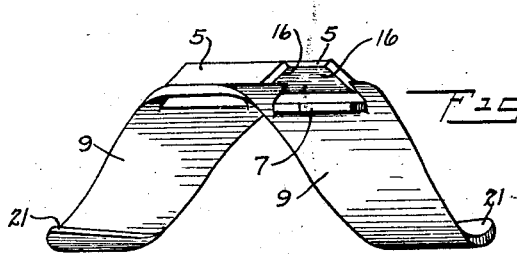
Frederick B Thomson
INVENTOR
BY Alanh Johnson
ATTORNEY

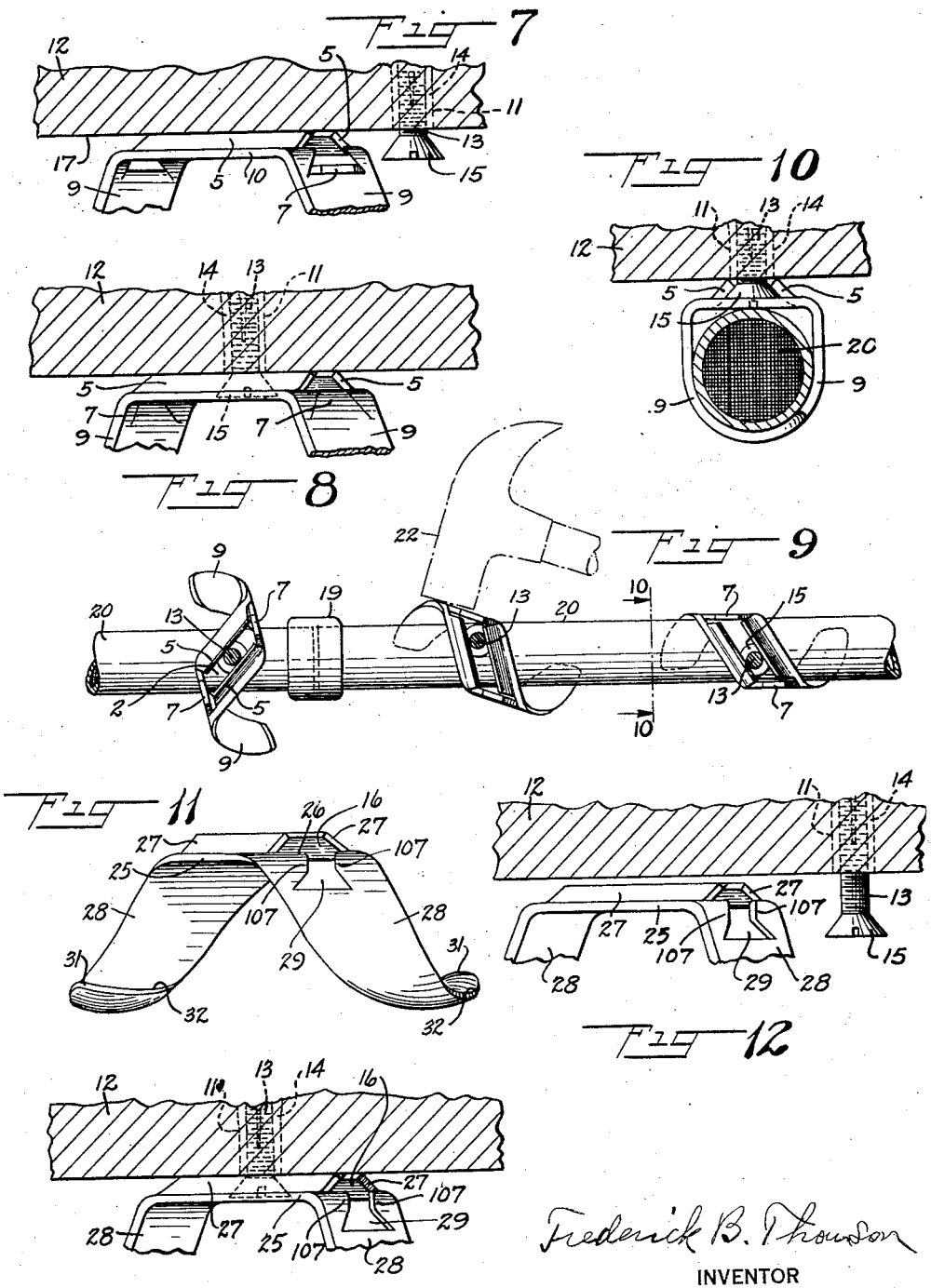

Patented Feb. 16, 1932

1,845,365

UNITED STATES PATENT OFFICE

FREDERICK B. THOMSON, OF TEANECK, NEW JERSEY

CONDUIT AND PIPE CLAMP

Application filed December 10, 1929. Serial No. 413,040.

My invention relates to the electrical art, in which conduits are employed to protect electric wires located within them, and it also relates to supporting pipes used for various purposes.

My invention further relates to certain combinations, details of construction, and articles of manufacture, which will be more fully hereinafter described and pointed out in the claims.

In the accompanying drawings the same reference numerals refer to similar parts in the several figures:

Fig. 1 is a plan view of a sheet metal blank from which my conduit and pipe clamp is formed.

Fig. 2 is a plan view of the same blank with the stops and flanges bent up.

Fig. 3 is a vertical cross section, on line 3—3 of Fig. 2, looking in the direction of the arrows.

Fig. 4 is a longitudinal vertical section on the line 4—4 of Fig. 2 looking in the direction of the arrows.

Fig. 5 is a plan view of the complete clamp.

Fig. 6 is a front elevation.

Fig. 7 is a fragmentary view, illustrating the clamp about to be secured to a previously positioned screw.

Fig. 8 is a fragmentary view, illustrating the clamp secured by the screw, and the stops bent back to prevent accidental disengagement of the clamp and screw.

Fig. 9 is a horizontal section through the screws, the conduit and clamps being shown in plan.

Fig. 10 is a vertical section on line 10—10 of Fig. 9, looking in the direction of the arrows.

Figs. 11, 12 and 13 illustrate a modification. Fig. 11 is a side elevation.

Fig. 12 is a fragmentary view illustrating the clamp about to be secured to a previously positioned screw.

Fig. 13 is a fragmentary view illustrating the clamp secured by the screw, and the fixed stops in position to prevent accidental disengagement of the clamp and screw.

Prior to my invention it has been old to support pipe by two supporting rigid fingers which were spaced apart from each other a distance as great as the diameter of the pipe to be held, so that the pipe and hanger could be engaged or disengaged from each other, simply by rotating the hanger with relation to the pipe.

Such a hanger supported the pipe without gripping or holding it against its own vibration, or that of the ceiling or wall of the building or other support. Moreover, such a hanger was essentially a ceiling hanger. When attempting to use such a hanger on a side wall, to support a vertical run of pipe, the pipe would slip down through the hanger, throwing all the weight of the pipe on some coupling or connection instead of distributing the load through the several pipe hangers. In other words, when used on a side wall, such a hanger was a guide for the pipe or conduit rather than a support; and, further, did not prevent rattling or relative movement between the pipe or conduit and the hanger. Such a hanger was also objectionable in that it required a plurality of holes for the affixing members to be off to the side of the pipe, and not in line with the pipe or conduit and did not permit adjustment of a clamp to compensate for faulty location of the holes in the support, due to careless workmanship, or to a drill meeting an obstruction in the wall or ceiling, or other support.

It is also old to have a clamp with spring arms provided with a hole for the reception of the shank of a screw or other securing means, the hole being of substantially the same diameter as the shank. But in this form the screw or similar securing means, cannot be first located in the support, and the clamp subsequently secured to it. Nor will the prior art referred to permit adjustment of the clamp, in case the screw might, inadvertently, be located off the center line of the run of pipe or conduit, due to poor workmanship, or to a drill meeting an obstruction in the wall, or ceiling, or from other cause.

In my improved conduit and cable clamp I overcome all these objections, and permit automatic adjustment of the clamp for any error in locating the screws off center, thereby insuring a quicker and more economical installation. My clamp also permits, if desired, the screws, or other securing means, to be pre-set along the wall, ceiling or other support, so that the clamps may be subsequently mounted on the screws.

Further, I provide locking means which will prevent the accidental disengagement of the clamp from the screws, or similar members. These locking means may be movable, or fixed, as the case may be.

In the form of my invention shown in Figs. 1 to 10 inclusive, I take a blank 1 of metal, preferably sheet steel, and provide it with a slot 2 and with kerfs or cuts 3, 3 Fig. 1. The dotted lines 4, 4 in Fig. 1 indicate the line on which the flanges 5, 5 are bent. The dotted lines 6, 6 indicate the lines on which the bendable stops 7, 7 are bent. The dotted lines 8, 8 indicate the lines on which the spring tension members, or arms, 9, 9 are bent.

The sides of the slot 2 of the blank 1 are then bent as shown in Fig. 2 to form the flanges 5, 5 and the bendable stops 7, 7. The ends of the blank are then bent to form the spring tension members, or arms 9, 9, the portion between the arms being the base 10. The final form of the clamp is illustrated in Fig. 5. The blank may be bent by hand, but is preferably bent in a machine.

In supporting a run of conduit or pipe from a ceiling, wall or other support, holes 11 are drilled into the support 12, if the support be masonry, concrete, brick, terra cotta or similar material in which a screw 13 can not be directly fastened. Into each hole 11 a ductile screw anchor 14, or other expansion bolt, is fastened, the screw being screwed into it as shown in Fig. 7. After the screw has expanded the screw anchor 14 my conduit clamp is slipped over the head 15 of the screw, the shank of the screw passing within the adjusting slot 2, the head being brought into engagement with the inclined surfaces 16, 16 of the flanges 5, 5. This prevents the head of the screw 15 marring the covering of the conduit, or the pipe. These flanges 5, 5 also space the clamp away from the surface 17 of the ceiling, wall, or other support 12, a distance sufficient to compensate for the thickness of the different couplings 19, Fig. 8 which permit the runs of conduit or pipe 20 to extend in a straight line, rather than in an undulating one as heretofore, due to bending the conduit or pipe to compensate for the thickness of the couplings 19.

After the clamp is in position the bendable stops 7, 7 are forced back, usually by one or two blows of a hammer, completely closing the slot 2, Fig. 8, and preventing any accidental disengagement of the clamp from the screw head 15.

The run of conduit or pipe 20 is then brought into position, Fig. 9, and the clamps partially rotated on the screws, sufficient to cause the ends 21, 21 of the spring tension members or arms 9, 9 to be sprung over the crown of the conduit or pipe. This is usually done by means of a hammer 22.

This insures that the conduit or pipe 20 will be firmly and positively gripped or held by the spring tension members or arms 9, 9 preventing rattling, or any relative movement between the clamp and the conduit or pipe. It also permits my clamp to be used on a side wall to support vertical runs of conduit or pipe, each clamp assisting in carrying the load and transmitting it to the wall.

In Fig. 9 it will be seen that the first screw 13, that on the left, is on center and that the other two are off center. The adjusting slot 2 permits of automatic adjustment of the clamp to compensate for the screws off center, due to slight error, poor workmanship or to the drill meeting some obstruction in the support.

It will be readily seen that my clamp permits of a quick and economical installation of conduits and pipes; that once installed, it is impossible for the clamp to become accidentally disconnected from the screw or other fastening means.

Should it be desired at some future time to remove the run of conduit or pipe 20, this can be done by forcing the ends 21, 21 of the tension members of the arms 9, 9 over the crown of the conduit or pipe. The clamp can then be removed from the support by bending out one of the stops 7, 7 permitting it to slip over the head 15 of the screw. Or, the screw may be unthreaded from the screw anchor 14 and removed, with the clamp, without bending one of the stops 7, 7.

I have illustrated in Figs. 11 to 13 inclusive a modification in which I employ non-bendable, or rigid stops 107, 107.

In this form the base 25 is provided with an adjusting slot 26, exactly the same as in the other form, and also provided with flanges 27, 27, similar in all respects with those in the other figures.

The base is provided with spring tension members 28, 28. Some little distance up one, or both, of the arms 28, 28, I provide a slot 29, preferably shaped to permit the free passage of the head 15 of the screw 13 Fig. 12, and to leave stops 107, 107. While a slot 29 may be formed in both arms 28, 28, I preferably provide only one arm with such a slot.

In this form of my invention the screws 13 are pre-set in their ductile screw anchors 14, the same as in the other form, but they are not screwed home permitting their heads 15 to extend out from the surface of the wall, or ceiling, a little further than in the form illustrated in Fig. 7.

In positioning the clamp, Fig. 12, the slot 29 is brought into line with the head 15 of the screw and then slid along until the head is about in the position illustrated in Fig. 13.

It is then screwed home which will cause the head to cooperate with the inclined surfaces 16, 16 of the flanges 27, 27, so that the head will firmly grip the clamp, and, at the same time, obtain the maximum expansion of the ductile screw anchor 14.

In screwing the screw home the head 15 is brought out of line with the slot 29, and into line with the fixed stops 107, 107. It is, therefore, clear that in this form, as well as in the other form, the clamp will be held to the support, without fear of any accidental disengagement between the clamp and screw.

In Fig. 11 I have shown the ends 31, 31 of the arms 28, 28 dished. This gives an increased grip of the tension members or arms 28, 28 upon the conduit or pipe due to the edges 32, 32 biting into, or tending to bite into, the pipe or conduit. This is particularly advantageous in vertical runs of pipe or conduit on side walls and materially increases the grip of the arms or tension members on the pipe or conduit. It is, of course, to be understood that the ends of the arms in the other form may be also dished if desired.

Having thus described this invention in connection with illustrative embodiments thereof, to the details of which I do not desire to be limited, what is claimed as new and what is desired to secure by Letters Patent is set forth in the appended claims:

1. A new article of manufacture comprising a conduit or pipe clamp having a base, means to support a conduit or clamp, and provided with an adjusting slot to cooperate with a screw, nail, or similar member, and means to prevent accidental disengagement of the clamp and screw, or nail.

2. A new article of manufacture comprising a sheet metal, conduit or pipe clamp having a base and integral flanges to space the base away from a wall to compensate for the thickness of pipe or conduit couplings, means to support a conduit or clamp, the base being provided with an open adjusting slot to receive the head of a screw or nail or similar member, and means to prevent the accidental disengagement of the screw or nail from said slot.

3. A new article of manufacture comprising a sheet metal, conduit or pipe clamp having a base and integral flanges to space the base away from a wall to compensate for the thickness of pipe or conduit couplings, means to support a conduit or clamp, the base being provided with an open adjusting slot to receive the head of a screw or nail or similar member, and integral bendable stops to prevent the accidental disengagement of the screw or nail from said slot.

4. A new article of manufacture comprising a sheet metal, conduit or pipe clamp having a base with an adjusting slot adapted to receive the head of a nail or screw or similar member, and provided with integral arms to support a conduit or pipe, one or more of the arms being provided with a slot to permit the insertion of a screw or nail head, and with stops to prevent the accidental disengagement of the said screw or nail head from the adjusting slot.

FREDERICK B. THOMSON.